Patented Dec. 16, 1947

2,432,830

UNITED STATES PATENT OFFICE 2,432,830

STABLE DISPERSIONS OF AROMATIC AMINES AND A PROCESS OF PREPARING THEM

Bernard M. Sturgis, Pitman, N. J., assignor to E. I. du Pont de Nemours & Company, Wilmington, Del., a corporation of Delaware No Drawing. Application January 4, 1945, Serial No. 571,363

8 Claims. (Cl. 252—311)

1

This invention relates to the preparation of stable dispersions of secondary aromatic amines which are particularly useful as antioxidants in the elastomer field.

The secondary aromatic amines which are employed as antioxidants in the rubber and synthetic rubber industries, when employed with rubber latices or other aqueous dispersions of synthetic elastomers are preferably incorporated in such latices as aqueous dispersions. These aqueous dispersions of the amines are prepared with the aid of dispersing agents by the methods usually employed for dispersing solids in liquids. Ordinarily, the aromatic amine antioxidant dispersion is made up, as it is used, in concentrations of from 10% to 60%, and such dispersions are added to the latex in carefully measured amounts prior to the coagulation and drying of the elastomer. The aqueous dispersions of the secondary aromatic amines prepared by the methods heretofore employed are often not stable, and, on standing even for short periods of time, the amine settles out quite rapidly. Such sedimentation makes the handling, measuring and proper addition of the amine to the latex difficult. When such settling out of the dispersion occurs, it tends to plug pumps, valves and lines. It will also be obvious that in such case the amount of antioxidant actually added to the latex cannot be accurately determined, and therefore it is important, for smooth operation of the process, that stable dispersions of the antioxidants be used.

It is difficult to make stable aqueous dispersions of secondary aromatic amines by the usual methods of dispersing solids in water, such as by grinding in a ball mill or even with the use of such efficient apparatus as the colloid mill. While most of the commercial wetting or dispersing agents give improved results when added to such suspensions, even the most efficient dispersing agents often fail to produce dispersions of these secondary aromatic amines which will not settle out after short periods of standing. The addition of larger amounts of the dispersing agent does not produce the desired stability.

It is therefore an object of this invention to provide a method of producing aqueous dispersions of secondary aromatic amines with improved stability with regard to settling. A further object of the invention is to produce the

2 aromatic amine in a form that it can be readily dispersed in water by the usual methods, but which will give suspensions that are much more stable with regard to settling than are ordinarily obtained. A further object of the invention is to produce aqueous dispersions of secondary aromatic amines in higher concentrations than has normally been possible and which will remain dispersed when diluted in water for a sufficient time to permit suitable processing of the rubber latices with which they are incorporated.

I have found that greatly improved dispersions of secondary aromatic amines can be produced by adding to the amine a small amount of a straight chain primary alcohol containing from 8 to 18 carbon atoms. The alcohol is preferably added to the amine during the manufacture or flaking process, as more particularly illustrated in the following examples, although it may be added during the preparation of the dispersion by adding it to the aqueous suspension and subjecting the mass to a milling or colloidal grinding operation. It appears that the alcohol must be incorporated in such a manner that it has intimate contact with the dispersed particles of the secondary amine, for, by merely adding the alcohol to the already prepared dispersion without again subjecting the mass to conditions which would ordinarily disperse the solid in a liquid, the same results are not obtained as when the alcohol is added to the amine during or prior to the dispersion operation. These alcohols are effective as dispersing aids in amounts ranging from 0.1% to 10%, although practical limits of use are from 0.1% to 3%, based on the weight of the secondary aromatic amine. Mixtures of alcohols of this type appear to be as effective as the pure alcohols by themselves. Derivatives of these alcohols which will decompose during addition to the amine, or during the dispersion process, to give the free alcohols are useful in carrying out this invention.

This invention is applicable particularly in improving the dispersion stability of secondary aromatic amines normally used as antioxidants for rubber or other elastomers. By secondary aromatic amines are meant organic chemical compounds containing at least one —NH— group attached to two aromatic rings. The aromatic rings may contain non-functional groups such as phenyl, benzyl, methyl, methoxy, phenoxy and chlorine. Examples of this type of compound are:

Diphenyl amine
Dinaphthyl amine
Diphenyl p-phenylene diamine
Dinaphthyl p-phenylene diamine
p-Benzyl diphenyl amine
p-Phenyl diphenyl amine
o-Methyl diphenyl amine
p,p'-Dichloro-diphenyl amine
p-Methoxy diphenyl amine
Ditolyl amine
p-Isopropoxy diphenyl amine As pointed out above, the alcohol may be added to the secondary aromatic amine during the manufacture of the amine, or it can be intimately incorporated with the amine by a mixing or milling operation so that the amine is put in a form that can be readily dispersed in water by the user by the methods generally employed in preparing the amine dispersion. Alternatively, the alcohol can be added to the water, amine and dispersing agent at the start of the dispersion process, or during the dispersion process. These alcohols will function in any of the common dispersion processes wherein the secondary aromatic amine is dispersed in water with a dispersing agent.

The straight chain aliphatic alcohols in themselves do not appear to have properties of dispersing agents, and they function as a dispersing aid where the secondary aromatic amine is dispersed in water by means of the usual dispersing agents. The preferred dispersing agent is the sodium salts of the reaction product of naphthalene, formaldehyde, and sulfuric acid, as more particularly disclosed in U. S. P. 1,336,759. Other dispersing agents, such as the sodium salts of sulfated laurol or other alcohols, or mixtures of the same, purified sulfolignins, and the sodium salts of aliphatic sulfonates of petroleum hydrocarbons or similar dispersing agents, may be employed in place of the sodium salts of the naphthalene-formaldehyde-sulfuric acid condensation product.

The following examples are given to illustrate the invention, in which the parts used are by weight.

*Example 1*

(A) 1000 parts of phenyl beta-naphthylamine were melted and flaked on a conventional drum type flaker, holding the melted material in the flaker pan at 140°–150° C. and the surface of the drum at 90° C.

(B) This flaked material was then made into an aqueous dispersion by mixing 300 parts of it, 700 parts of distilled water, and 6.0 parts of the sodium salts of the reaction product of naphthalene, formaldehyde and sulfuric acid described in U. S. P. 1,336,759. This mixture was ground through a Charlotte colloid mill set at .0055 inch clearance for 20 minutes.

(C) After the 20 minute grinding period, a 75 cc. sample of the dispersion was placed in a 100 cc. graduated cylinder, brought up to 100 cc. with distilled water, shaken vigorously, and allowed to stand for 20 minutes. After this period 13 cc. of sediment had settled out of this dispersion. When the liquid in the cylinder was slowly poured out, this sediment remained behind in the cylinder.

*Example 2*

The flaking process was repeated exactly as in Example 1A on the same sample of unflaked phenyl beta-naphthylamine, except that 1% of lauryl alcohol was added to the melted amine just prior to flaking. The flaked phenyl beta-naphthylamine containing lauryl alcohol was then dispersed in water by the same procedure as used in Example 1B. When tested for stability by the method of Example 1C, no sediment had settled out after standing for 20 minutes, and the dispersion appeared unchanged.

*Example 3*

A sample of phenyl beta-naphthylamine which had been ground to pass 100% through a 200 mesh screen, was dispersed in water by the method of Example 1B. When tested as in Example 1C, 6 cc. of sediment had settled to the bottom of the graduated cylinder after the dispersion had stood for 20 minutes.

*Example 4*

A sample of the same crude phenyl beta-naphthylamine used in Example 3 was melted and 1% of lorol added in the molten state. (Lorol is a mixture of alcohols derived from the reduction of cocoanut oil acids. It consists predominately of normal straight chain alcohols of from 10 to 18 carbon atoms, and is mostly C–12 and C–14 alcohols.) The amine was then cast and ground to pass 100% through a 200 mesh screen. This powder was dispersed by the method of Example 1B. When tested as in Example 1C, the dispersion after standing for 20 minutes had deposited no sediment and remained perfectly smooth and uniform.

*Example 5*

A sample of flaked phenyl beta-naphthylamine containing 0.5% of cetyl alcohol blend which had been added prior to the flaking operation was made into a 30% aqueous dispersion in the Charlotte colloid mill as in Example 1B, and subjected to the same settling test disclosed in Example 1C. (Cetyl alcohol blend is a mixture of alcohols consisting predominately of normal straight chain alcohols of from 12 to 18 carbon atoms, and is mostly C–14 and C–16 alcohols.) After 20 minutes, no sediment has appeared.

*Example 6*

To 2000 pounds of molten phenyl beta-naphthylamine was added 5 pounds of cetyl alchohol blend. The mixture was then flaked and ground to pass 100% through a 200 mesh screen. This powder was dispersed in water by the method of Example 1B and tested for stability in the same manner as in Example 1C. After 20 minutes standing, no sediment had separated.

*Example 7*

300 parts of the flaked phenyl beta-naphthylamine of Example 1 was mixed with 700 parts of water, 6.0 parts of the sodium salt dispersing agent used in Example 1B, and 0.3 part of lorol. This mixture was ground for 20 minutes through a Charlotte colloid mill set at .0055 inch clearance, then the dispersion tested for stability as in Example 1C. After standing for 20 minutes, no sediment had deposited.

The alcohols which are operative in this process are those within a narrow range. Highly branched alcohols, and secondary alcohols are either inoperative or are much less effective than the straight chain primary alcohols. Of the straight chain primary alcohols those containing from 8 to 18 carbon atoms have been found to be the most effective. This is illustrated by the following example.

*Example 8*

Two pound samples of the same batch of phenyl beta-naphthylamine were melted and 0.2 pound each of a number of alcohols mixed in. The amine samples containing the alcohols were then flaked, and the flaked material dispersed in water as in Example 1B. The dispersions were tested for stability as in Example 1C, and the results obtained after 20 minutes standing are given in the following table.

| Alcohol | C-atoms | Chain type | Type of Alcohol | cc. Sediment after 20 mins. |
|---|---|---|---|---|
| n-hexanol | 6 | straight | primary | 10.5 |
| n-octyl | 8 | do | do | none |
| n-decyl | 10 | do | do | none |
| lauryl | 12 | do | do | none |
| n-tetradecyl | 14 | do | do | none |
| cetyl alcohol | 16 | do | do | none |
| stearyl alcohol | 18 | do | do | 5 |
| C-24 alcohol | 24 | mixed | mixed | 15.5 |
| secondary hexyl alcohol | 6 | straight | secondary | 14 |
| 2-methyl-2,4-pentane diol | 6 | branched | secondary diol | 10.5 |
| 7-ethyl-2-methyl un-decanol-7 | 14 | do | secondary | 26.75 |
| pentadecanol-8 | 15 | straight | do | 19.5 |
| tridecanol-2 | 30 | do | do | 10.75 |
| control—no alcohol | | | | 10.75 |

Some of the secondary aromatic amines disperse in water more easily than phenyl beta-naphthylamine. However, in every case the presence of a straight chain primary alcohol of from 8 to 18 carbon atoms, or mixtures of such alcohols, improves the dispersion stability of these amines. This is illustrated by the following examples.

*Example 9*

A mixture of 25 parts phenyl alpha-naphthylamine, 75 parts of water, and 0.5 part of the sodium salt dispersing agent used in Example 1, was recirculated through a Charlotte colloid mill, using a clearance of .0055 inch. The mixture became too thick to grind after 10 minutes. In a similar experiment, using phenyl alpha-naphthylamine containing 1% lorol (incorporated by mixing with the molten amine), the grinding could be carried out for the standard 20 minute period. The resulting dispersion was very stable and gave no settling, when tested as in Example 1C, after standing for 20 minutes.

*Example 10*

10 parts of phenyl alpha-naphthylamine, 90 parts of water, and 0.2 part of the sodium salt dispersing agent used in Example 1B, were placed in a ball mill and milled for 24 hours. At the end of this period, a poor dispersion resulted. The solid was not well suspended in the liquid and the mill was full of froth. In a similar experiment using phenyl alpha-naphthylamine containing 1% of lorol, a smooth, uniform dispersion was obtained and no froth was present.

*Example 11*

30 parts of diphenyl para-phenylene diamine, 70 parts of water, and 0.6 part of the sodium salt dispersing agent used as in Example 1B, were recirculated through a Charlotte colloid mill using a .0055 inch clearance for a period of 20 minutes. A similar experiment was conducted with diphenyl para-phenylene diamine containing 1% of lorol. The dispersion of the amine containing the lorol was much smoother and thinner and possessed a smaller particle size as determined by microscopic examination.

*Example 12*

30 parts of diphenylamine, 70 parts of water, and 0.3 part of the sodium salt dispersing agent used in Example 1B, were ground through a Charlotte colloid mill set at .0055 inch clearance. A good dispersion could not be made, and the product became too thick to grind. 0.6 part of the dispersing agent, or 2% based on the diphenylamine, was necessary in order to obtain a good dispersion. Using diphenylamine containing 1% of lorol, a good dispersion was obtained with only 0.3 part of the dispersing agent. This dispersion, when tested as in Example 1C, did not settle out after standing 20 minutes.

*Example 13*

30 parts of di-para-methoxy diphenylamine, 70 parts of water, and 0.15 part of the sodium salt dispersing agent used in Example 1B, were ground with recirculation through a Charlotte colloid mill using a clearance of .0055 inch. After 10 minutes, the mixture became too thick to grind and yielded a poor dispersion. Repeating the experiment using di-para-methoxy diphenylamine containing 1% of lorol, the usual 20 minute grind was carried out without difficulty and a perfectly smooth dispersion free from sediment was obtained.

The improvement in dispersion effected by the use of the alcohols of this invention is not obtained by replacing the alcohols with commercial wetting and dispersing agents. This is illustrated by the following example.

*Example 14*

1000 gram samples of phenyl beta-naphthylamine were melted, and 1% of the additive (see following table) mixed in. The samples were then flaked on a drum flaker. The flaked material was then dispersed in water as in Example 1B, using 2.0% of the dispersing agent as in that example, and tested as in Example 1C. Results of these dispersion tests are given in the following table.

| Additive | cc. of Sediment after 20 mins. |
|---|---|
| Control—no additive | 10 |
| Sodium salts of the dispersing agent used in Example 1 | 9 |
| Sodium salt of an aliphatic hydrocarbon sulfonate | 23 |
| C-cetyl betaine | 13 |
| Sodium stearate | 16 |
| Turkey red oil | 13 |
| Light Petroleum oil | 20 |

The use of the primary straight chain alcohols of from 8 to 18 carbon atoms enables the production of greatly improved aqueous dispersions of the secondary aromatic amines. These dispersions being more stable, can be used over much longer periods of time without settling out. By the addition of the straight chain alcohols of the type described as a dispersing aid, greatly improved dispersions are obtained, usually being much smaller in particle size, having lower viscosity for a given concentration, and having less tendency to foam. By the addition of these dispersing aids much smaller amounts of the dispersing agent may be employed, as illustrated in Example 12.

The dispersions formed according to the present invention may be added to any aqueous dispersion of oxidizable organic materials requiring stabilization by means of secondary aromatic amines.

I claim:

1. In the process for preparing aqueous dispersions of secondary aromatic amines wherein the secondary aromatic amine is dispersed in water by means of a dispersing agent, the step which comprises incorporating in such aqueous dispersion, before the colloidal milling operation employed in effecting the dispersion process is completed, from 0.1% to 10%, based on the weight of the amine, of a primary straight chain aliphatic alcohol which contains from 8 to 18 carbon atoms.

2. The process for preparing aqueous dispersions of secondary aromatic amines which comprises intimately incorporating in the secondary aromatic amine from 0.1% to 10%, based on the weight of the amine, of a primary straight chain aliphatic alcohol containing from 8 to 18 carbon atoms, and dispersing the resulting product in water by means of a dispersing agent.

3. In the process for preparing aqueous dispersions of phenyl-beta-naphthylamine wherein the phenyl-beta-naphthylamine is dispersed in water by means of a dispersing agent, the step which comprises incorporating in such aqueous dispersion, before the colloidal milling operation employed in effecting the dispersion process is completed, from 0.1% to 10%, based on the weight of the amine, of a cetyl alcohol blend consisting predominantly of straight chain alcohols of from 12 to 18 carbon atoms and principally those of 14 to 16 carbon atoms.

4. The process for preparing aqueous dispersions of phenyl-beta-naphthylamine, which comprises intimately incorporating in the phenyl-beta-naphthylamine from 0.1% to 10%, based on the weight of the amine, of a primary straight chain aliphatic alcohol containing from 8 to 18 carbon atoms, and dispersing the resulting product in water by means of a dispersing agent.

5. An aqueous dispersion of a secondary aromatic amine which contains as a dispersion aid from 0.1% to 10%, based on the weight of the amine, of a primary straight chain aliphatic alcohol of from 8 to 18 carbon atoms, and in which the primary straight chain aliphatic alcohol is incorporated before the colloidal milling operation employed in effecting the dispersion is completed.

6. An aqueous dispersion of phenyl-beta-naphthylamine which contains as a dispersion aid from 0.1% to 10%, based on the weight of the amine, of a cetyl alcohol blend consisting predominantly of straight chain alcohols of from 12 to 18 carbon atoms, and principally those of 14 to 16 carbon atoms, in which the cetyl alcohol blend is incorporated before the colloidal milling operation employed in effecting the dispersion is completed.

7. A readily dispersible secondary aromatic amine composition comprising the secondary aromatic amine, with which is intimately incorporated from 0.1% to 10%, based on the weight of the amine, of a primary straight chain aliphatic alcohol of from 8 to 18 carbon atoms.

8. A readily dispersible phenyl-beta-naphthylamine composition comprising the phenyl-beta-naphthylamine having incorporated therewith from 0.1% to 10%, based on the weight of the amine, of a cetyl alcohol blend consisting predominantly of straight chain alcohols of from 12 to 18 carbon atoms, and principally those of from 14 to 16 carbon atoms.

BERNARD M. STURGIS.

REFERENCES CITED

The following references are of record in the file of this patent:

UNITED STATES PATENTS

| Number | Name | Date |
|---|---|---|
| 1,838,034 | Cadwell | Dec. 22, 1931 |
| 2,100,714 | Hiers | Nov. 30, 1937 |
| 2,127,770 | Franz | Aug. 23, 1938 |
| 2,136,335 | Cramer | Nov. 8, 1938 |
| 2,344,671 | Bertsch | Mar. 21, 1944 |
| 2,379,769 | Vinograd | July 3, 1945 |

OTHER REFERENCES

"Du Pont Rubber Chemicals," Feb. 1943, pages 75–76.

Certificate of Correction

Patent No. 2,432,830.  December 16, 1947.

BERNARD M. STURGIS

It is hereby certified that errors appear in the printed specification of the above numbered patent requiring correction as follows: Column 7, line 24, claim 1, and line 42, claim 3, strike out the word "process"; and that the said Letters Patent should be read with these corrections therein that the same may conform to the record of the case in the Patent Office.

Signed and sealed this 30th day of March, A. D. 1948.

[SEAL]

THOMAS F. MURPHY,
*Assistant Commissioner of Patents.*